United States Patent [19]

Ikedo

[11] 4,088,842
[45] May 9, 1978

[54] AUTOMATIC COORDINATE DETERMINING DEVICE

[75] Inventor: Tsuneo Ikedo, Tokyo, Japan

[73] Assignee: Kabushiki Kaisha Daini Seikosha, Japan

[21] Appl. No.: 688,835

[22] Filed: May 21, 1976

[30] Foreign Application Priority Data

| May 23, 1975 | Japan | 50-62191 |
| May 28, 1975 | Japan | 50-64470 |
| Nov. 17, 1975 | Japan | 50-138002 |
| Feb. 10, 1976 | Japan | 51-13594 |

[51] Int. Cl.² .................. H04N 1/00; G08C 21/00
[52] U.S. Cl. ........................................................ 178/19
[58] Field of Search ................................... 178/19, 18

[56] References Cited

U.S. PATENT DOCUMENTS

| 3,647,963 | 3/1972 | Bailey | 178/19 |
| 3,819,857 | 6/1974 | Inokuchi | 178/19 |
| 3,904,822 | 9/1975 | Kamm et al. | 178/19 |

OTHER PUBLICATIONS

"Inductive Tranducers for Graphical Input Devices," Ivaschentzo et al., "Soviet Journal of Inst'n. & Control," for Aug. 1969, pp. 22–25.

Primary Examiner—Thomas A. Robinson
Attorney, Agent, or Firm—Robert E. Burns; Emmanuel J. Lobato; Bruce L. Adams

[57] ABSTRACT

A device for detecting position coordinates of patterns such as graphs and characters which are plotted on a drawing media. The device includes a tablet on which a plurality of conductive lines are installed parallel to each other, and a probe positionable for selecting a position coordinate. The probe comprises circular coils which are in a mutual inductive relation with the conductive lines. The device determines the coordinate of the probe relative to the tablet by selecting and filtering a mixed signal which is produced when scanning signals are applied to the conductive lines to induce signals in the probe coils. A wireless probe and a plurality of probes can be used on one tablet.

22 Claims, 20 Drawing Figures

AUTOMATIC COORDINATE DETERMINING DEVICE

BACKGROUND OF THE INVENTION

1. Field of the Invention

A device for determining position coordinates on a flat surface.

2. Description of the Prior Art

Many existing devices for determining position coordinates are constructed with a tablet, a stylus pen and the like. One group of such devices includes a tablet which has a plurality of conductive lines located at equal intervals, and a stylus pen with electromagnetic induction windings to which signals are applied. A conductive line facing the stylus pen picks up a signal induced from the stylus pen, whereby the position coordinates of the pen relative to the plurality of conductive lines are determined.

Another group of known devices is based on the principle of electromagnetic induction. The position coordinates of a cursor having an excitation coil are determined by comparing the phase of a signal induced in a loop-shaped sensing line on the tablet with the phase of a signal applied to the excitation coil of the cursor to determine whether it is placed within or outside of the line.

In these types of devices using electromagnetic induction, the circuit for detecting position coordinates can be made comparatively simply because the interval between scanning or sensing lines is equal to the resolution of the position coordinates. But on the other hand, the devices are easily interfered with by external noise because the devices employ a high impedance sensor.

It is another disadvantage to make the scanning circuit comprising a large number of lines used within and it is difficult to manufacture a large sized tablet for the purpose of increasing the resolution.

The devices which determine the coordinates by continuously detecting the phase difference between excitation signal and induced signal also have the disadvantage that the absolute coordinate position can not be obtained relative to the tablet because these values are determined by signals which exhibit a repetitive 180° phase shift. Once the cursor is moved away from the tablet, the established coordinate system is never obtained again.

These characteristics can be prevented if the position coordinates are manually put into a memory when the cursor is removed, or if the sensing line for detecting the absolute coordinates position are newly installed.

But it is disadvantageous that operation require rather difficult procedures or the tablet be made complicated in structure.

In these existing coordinate determining devices, the signal of the sensor and the applied signal should be synchronized. Also it is required that wire made of a plurality of lines which is connected to the signal generator should be provided for the stylus pen or cursor.

BRIEF SUMMARY OF THE INVENTION

The principal object of the present invention is to provide an automatic coordinate determining device having simple construction, with which an absolute coordinate value is reliably determined.

Other objects and advantages of the invention will become apparent from the following description of the preferred embodiments.

DETAILED DESCRIPTION OF THE PREFERRED EMBODIMENTS

Figure 1:
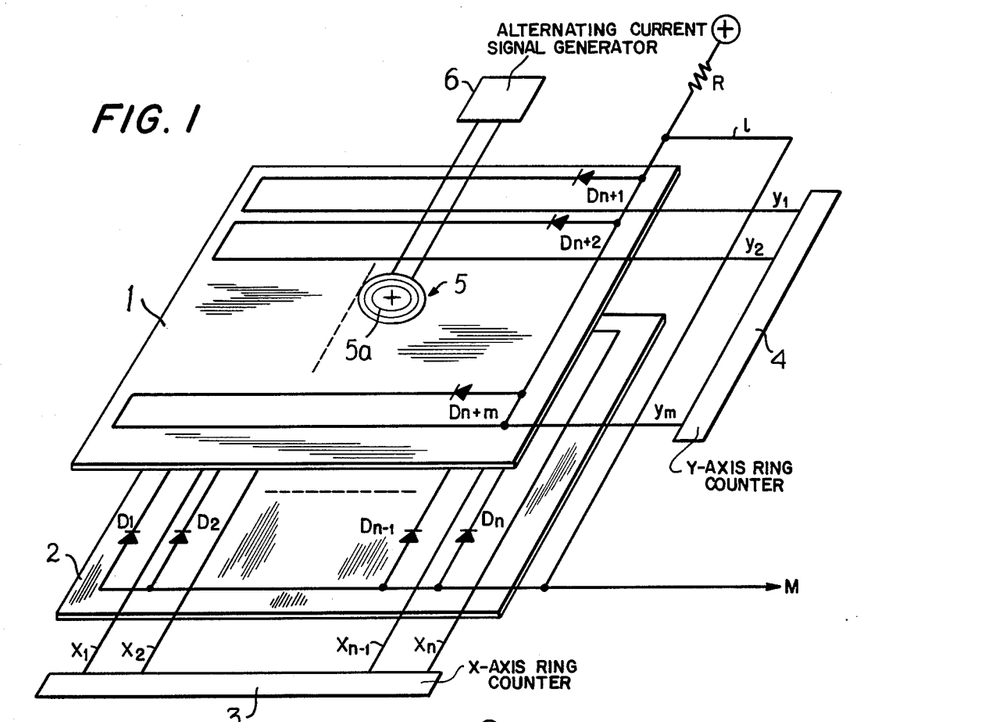
FIG. 1 is a schematic perspective view showing the relationship between the construction of the tablet and the conductive lines of this invention.

Referring now to the attached drawings showing the disclosed preferred embodiments, in which FIG. 1 shows a tablet for use with this invention. In FIG. 1, numerals 1 and 2 represent flat plates tablet which are made of insulating material and are installed by contacting each other to form a multi-layer structure. The flat plates 1 and 2 are provided with a plurality of conductive lines $X_1, X_2, \ldots, X_n$ and $Y_1, Y_2, \ldots, Y_m$, each of which is respectively formed in a U-shape having a pair of parallel lines. The U-shaped conductive lines $X_1, X_2, \ldots X_n$ are spaced parallel with each other and with gaps $g$ (shown in FIG. 2) or without any gap. This layout results in effective induction accompanied by superior sensitivity and accuracy and eliminates any insensitive area.

The U-shaped conductive lines $Y_1, Y_2, \ldots Y_m$ also have the same layout as conductive lines $X_1, X_2 \ldots X_m$ have and are arranged prependicular to the former conductive lines $X_1, X_2, \ldots X_n$.

One end of each conductive line is respectively connected to the output terminal of scanning circuits (such as ring-counters) 3 and 4, the other end being connected to a diode D1, D2, . . . Dn+m respectively. These diodes have a common output line 1 which is connected to a power source through resistor R and to a maximum-signal detecting device M.

The conductive lines Y1, Y2, . . . Ym may be installed on the opposite surface of tablet 1 and on the surface opposite the conductive line surface carrying the lines X1, X2, . . . Xn.

Numeral 5 designates a probe which generates alternating field for pointing to a coordinate position and the probe consists of excitation winding 5a forming concentric circles and of alternating current signal generator 6.

Figure 2:
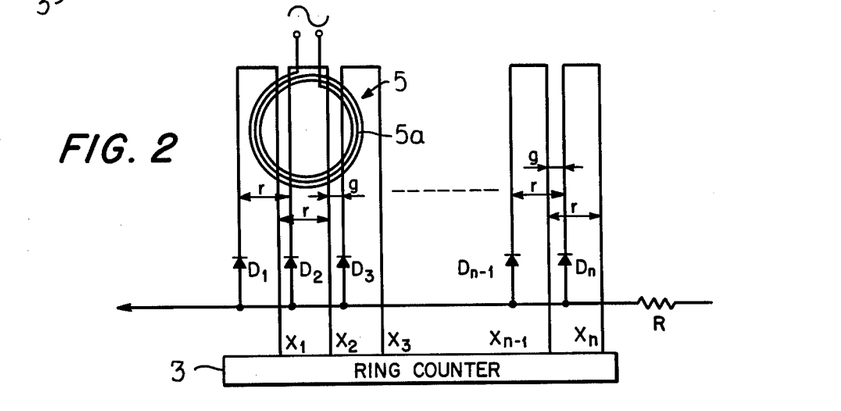
FIG. 2 is a schematic plan view showing the formation of the conductive lines and pitch interval of this invention.

FIG. 2 shows an example of the arrangement of the scanning lines on the tablet of this invention, in which the conductive lines only in one direction are represented. As shown in FIG. 2, the conductive lines X1, X2, . . . Xn are spaced with a pitch r. Each of the conductive lines is connected to ring counter 3 at one end and the other end of the conductive lines is connected with diodes D1, . . . Dn. The excitation winding 5a which is excited by alternating current from the signal alternating current generator 6 is preferred to have an inner diameter larger than 2r.

The gaps g between a pair of parallel lines, a line to ring counter 3 and the line to the maximum signal detecting device M of the next U-shaped line, are made small and preferably are zero, for eliminating any insensitive area on the tablet.

Figure 3A:
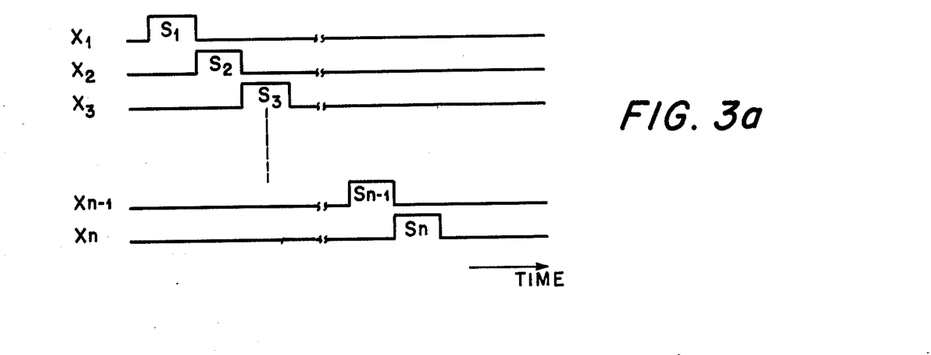
FIGS. 3a to 3c are graphical representation showing the waveform of the scanning signal produced on the conductive lines as shown in FIG. 2 and the induced signal which superposes on the scanning signal.

FIG. 3a shows a time-chart of the output waveforms applied to the conductive lines from the ring counter 3. The ring counter 3 scans one line after another and successively applies rectangular wave signals one after another to lines X1, X2, . . . Xn. When the scanning signal S1 is applied to conductive line X1, the signal S1 passes through the diode D1.

Figure 3B:
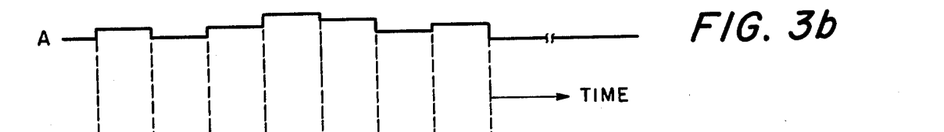

On the output line 1, when the signals S1, S2, . . . Sn are applied to the conductive lines X1, X2, . . . Xn respectively, the line signal has a random stepped waveform as shown in FIG. 3b, because of differences of the forward voltage drop of the diodes.

When an alternating current signal is applied to the winding 5a, an induced voltage is developed in the conductive lines on the tablet 1 and 2.

The maximum amplitude of the induced voltage in the conductive lines is obtained at the line which is located at the nearest point to the excitation winding 5a, but some lower voltages are induced at lines in the rear area. But the induced voltages do not appear at the output lines unless the scanning signal is applied, since the amplitude of the induced voltage is very low in comparison with the forward voltage drop (approx. 0.6 − 0.7V) of the diodes.

The diodes are uni-directional. So, when the scanning signals, for example S1, S2, . . . Sn are shown in FIG. 3a, are applied, the scanning current never flows into other scanning lines because the cathode terminals of the diode must be biased for reverse condition.

It is not restricted to this drive that the scanning signal should have a positive going waveform as shown in FIG. 3a. For the signal having a negative going waveform, each anode terminal of the rectifiers are commonly connected, whereby the reverse voltage is fed to the output line 1. Thus similarly as with a positive going waveform, the induced voltage does not appear at the output line 1 unless the scanning signal is applied.

That is, the signals which can appear at the output line 1 are defined only by both the scanning signal and the induced signals carried on the scanning signal.

Figure 3C:
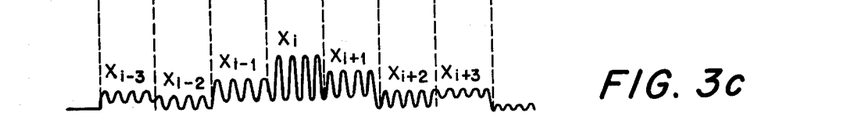

Therefore, when the probe 5 is placed on an arbitrary position of the tablet (i.e. near the conductive line No. Xi), the induced voltages, for which a maximum amplitude is obtained on the conductive line Xi, appear at the output line 1, superposed on the scanning signal as shown in FIG. 3c.

Figure 4:
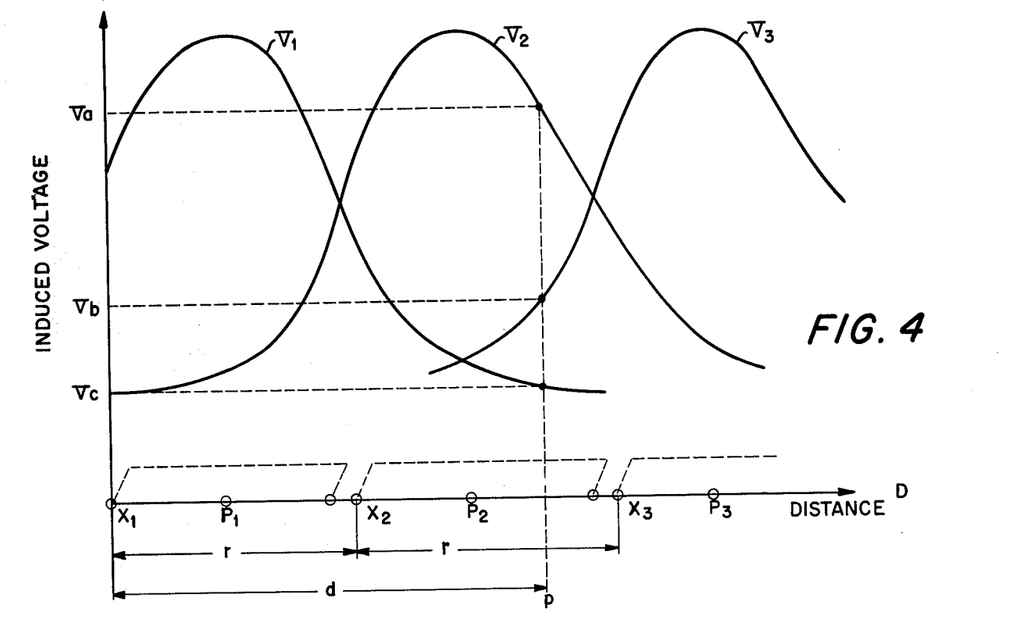
FIG. 4 is a graph showing the relationship between the position of the excitation coil placed on the conductive lines and the induced voltage developed in the conductive lines.

FIG. 4 shows the relationship between the location of probe 5 relative to the conductive lines, and the amplitude of the induced voltages at the conductive lines, in which curves V1, V2 and V3 respectively represent the induced voltages in conductive lines X1, X2 and X3. When probe 5 is located at point P, Vo, Va and Vb respectively represent the induced voltages in lines X1, X2 and X3.

Figure 5:
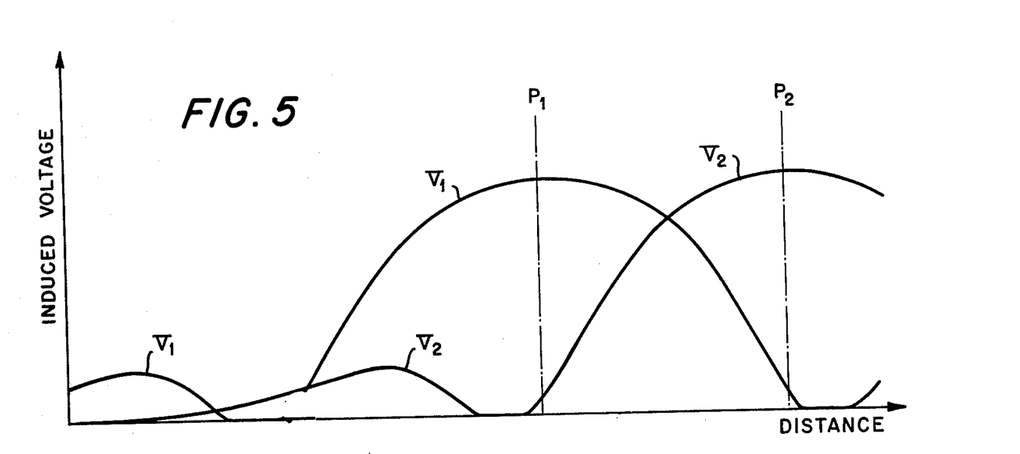
FIG. 5 is a graph showing an induced waveform in the conductive lines in detail.

Generally, the induced voltage has the maximum amplitude when probe 5 is just at the center of the U-shaped line and gradually decreases in proportion to the deviation of the probe to either of ths sides, but exactly, the voltage again rises a little, as is shown in FIG. 5, after further deviation of the probe, making symmetric minor peaks about the maximum peak.

A trough between the maximum and a minor peak appears when the probe is located at a position where in inner flux of winding 5a penetrating through the U-shaped area of the conductive line is equal to an outer-flux penetrating through the U-shaped area of the same line. This position of the probe is where the center of the winding 5a is approximately a half distance of the winding inner diameter from the center of the U-shape. Therefore, if the winding diameter is larger than twice the conductive line pitch r, the induced voltage curve from the center of the U-shaped conductive line to the center of the next U-shaped conductive line decreases monotonously. This setting of the winding inner diameter with regard to the conductive line pitch is valuable for determination of accurate intermediate coordinates, which will be described later.

Figure 6:
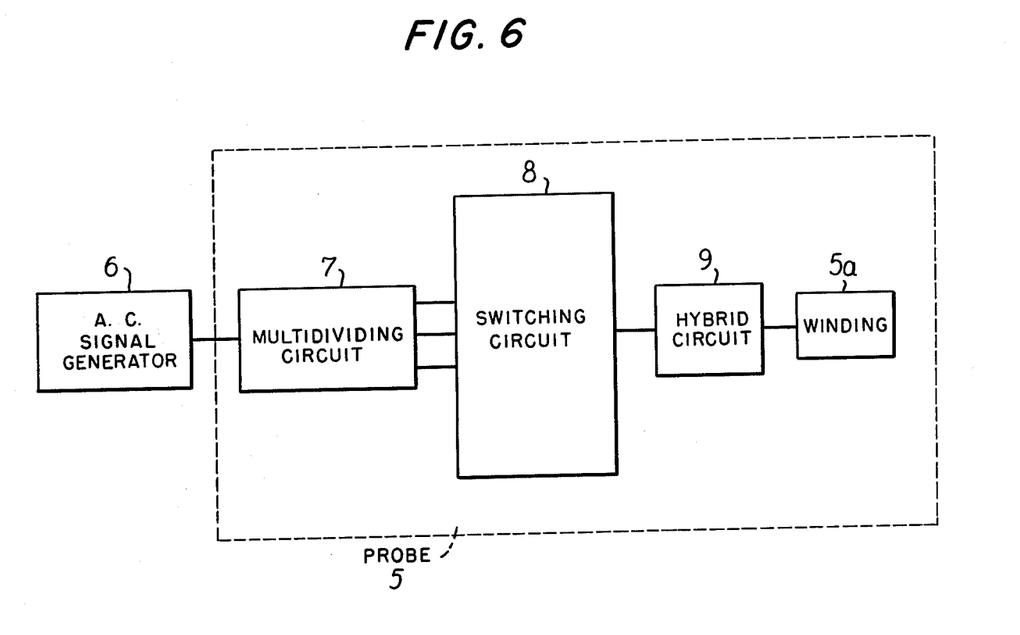
FIG. 6 is a block diagram showing circuits in a probe of this invention.
Figure 7:
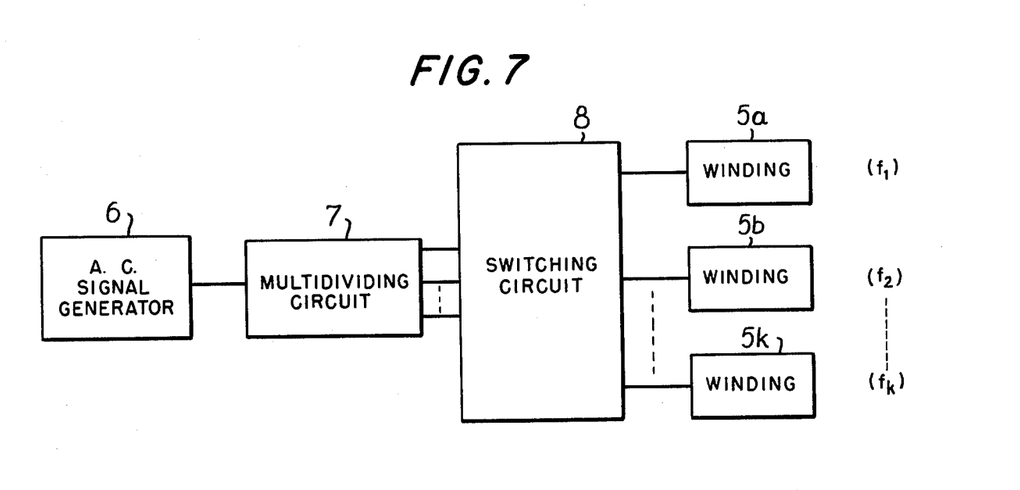
FIG. 7 is a block diagram showing circuits in a probe of another embodiment according to this invention.

FIG. 6 is a block diagram showing circuits comprising a probe 5 and a signal generator 6. In the probe 5 a multi-dividing circuit 7 receives a raw signal of a high frequency from signal generator 6 and divides it into several kinds of lower-frequency signals of different frequencies $f_o$, $f_1$, . . . and $f_k$, which are fed into a switching circuit 8 to be selected for excitation winding 5a. Numeral 9 designates a hybrid circuit to hybridize a plurality of various frequency signals fed from switching circuit 8. These plural signals which are applied to winding 5a induce signals of their corresponding frequencies in the conductive lines for determining coordinates of the probe and further for giving various command signals such as point reading or time mode reading. When two or more probes are desired on one tablet, a signal generator 6, a divider 7, a switching circuit 8 and a plurality of windings 5a, 5b . . . and 5k, as shown in FIG. 7 may be preferred.

Figure 8:
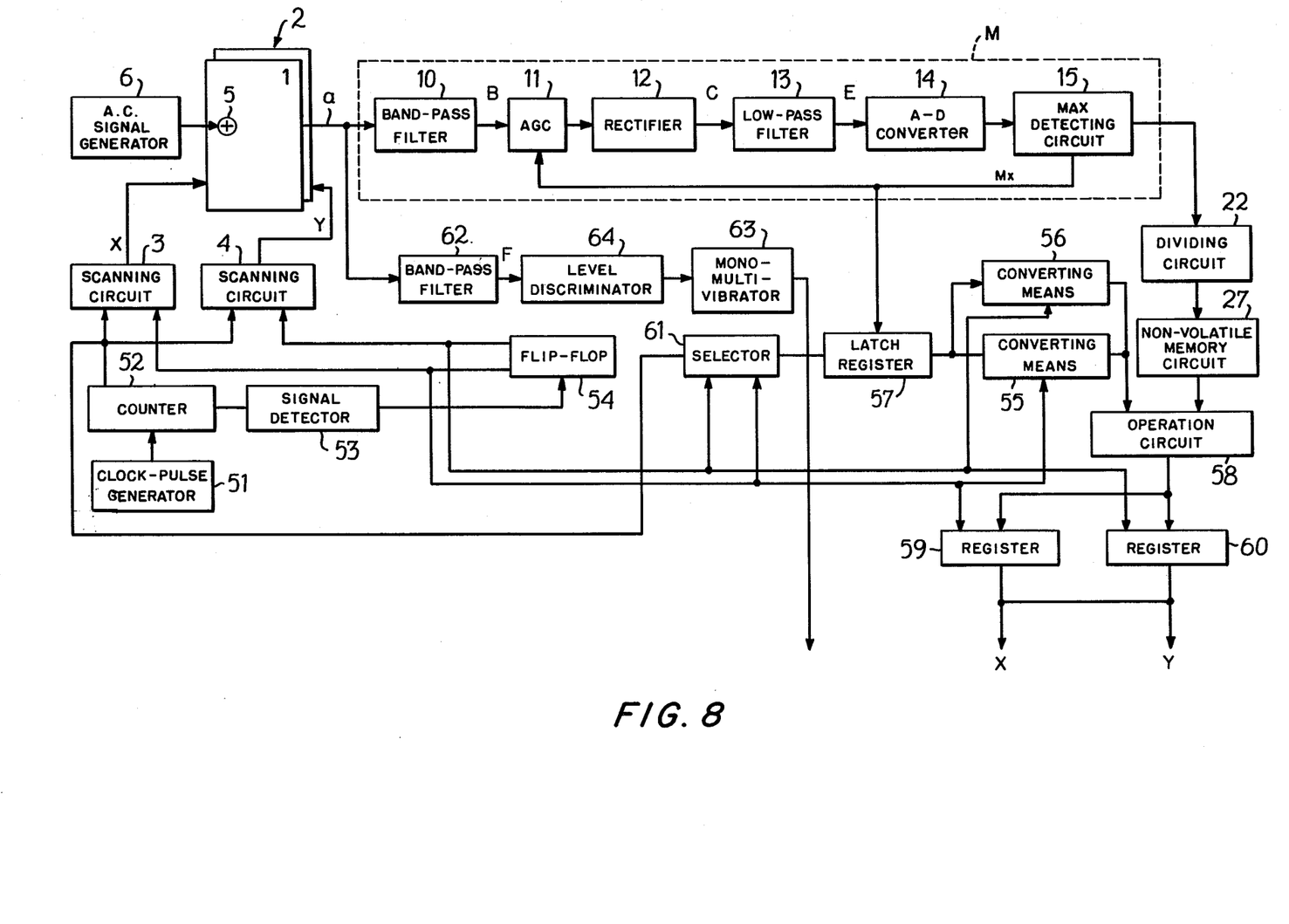
FIG. 8 is a schematic diagram showing the automatic coordinate determining device of the invention.

FIG. 8 is a block diagram showing the whole construction of circuits for detecting position coordinates in an embodiment according to this invention.

In FIG. 8, numerals and marks in FIGS. 1 to 5 are also used in common. Maximum magnitude detector M which receives the induced signals, as shown by A in FIG. 9, from output line 1 of tablets 1 and 3 includes a bandpass filter 10 to pass the signal of frequency $f_o$, shown by B in FIG. 9, an automatic gain controller 11 to control the level of the signal fed from band-bass filter 10, a rectifier 12 to rectify the signal B in FIG. 9 into the fullwave signal E in the same figure, and a low-pass filter 13 to smooth the fullwave signal as shown by H in FIG. 9.

Figure 9:
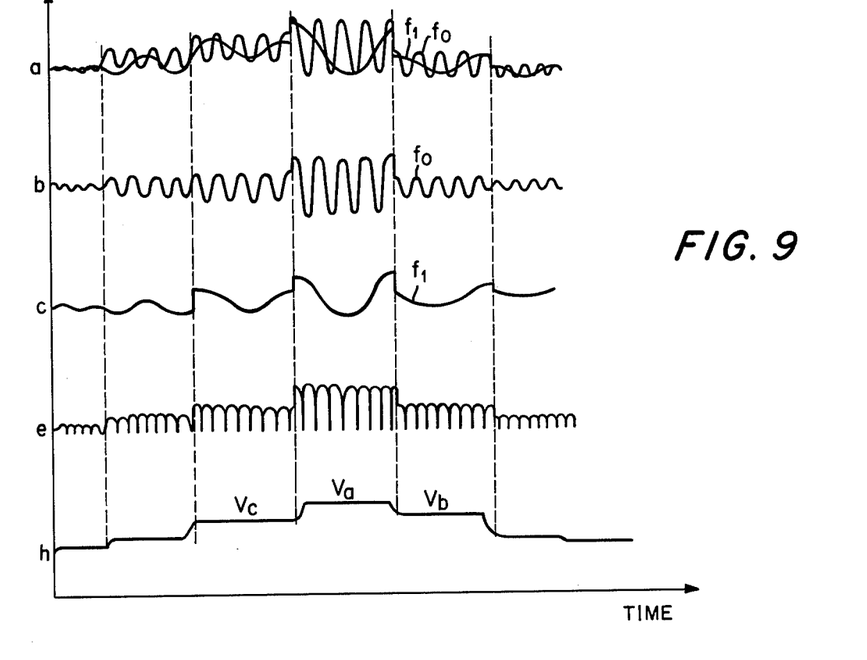
FIG. 9 is a graphical representation of waveforms developed in each portion of the circuits shown in FIG. 8.

In the curve of H in FIG. 9, Va designates the maximum amplitude, Vb is the second and Vc is the third signals. These signals are respectively induced in adjacent conductive lines and are successively transferred to the maximum magnitude detector M.

Figure 10:
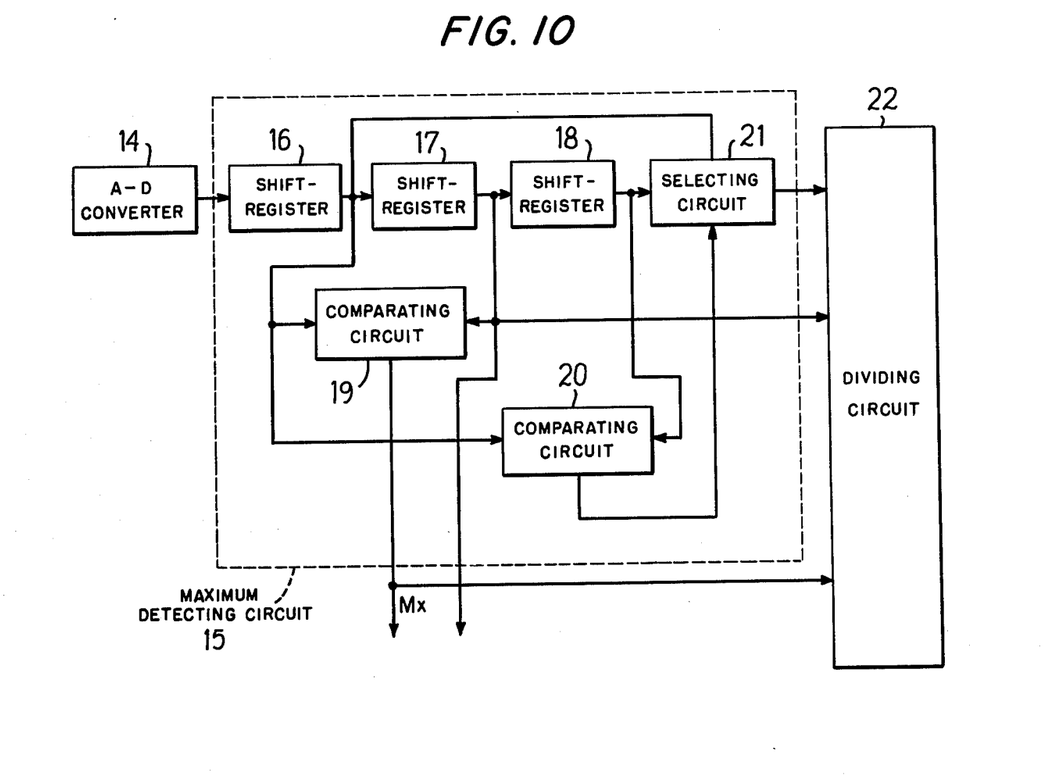
FIG. 10 is a block diagram showing the maximum signal detecting circuit in FIG. 8.

The maximum magnitude detector M further includes an A-D converter 14 to convert the analogue signal into a digital signal, and a maximum magnitude detecting circuit 15 will now be described hereinafter referring to FIG. 10, in which numerals 16 to 18 designate a shift-register to receive the digital signals from the A-D converter, numerals 19 and 20 are digital magnitude comparators, the comparator 19 comparing the output data of register 16 with that of register 17 and comparator 20 comparing the output data of register 16 with that of register 18, and numeral 21 designates a selector for selecting between the output data of register 16 and that of register 18.

A signal train as H shown in FIG. 9 is, after converted to a digital signal, received by register 16, register 16 having a latest signal, register 17 the next latest signal and register 18 stores a signal developed just prior to the next latest signal stored in register 17. When the maximum signal Va reaches register 17, the second largest signal Vb stays at register 16 and the signal Vc stays at register 18. At this step, register 17 has a larger magnitude than that at register 16, while before this step register 17 had a smaller magnitude. Accordingly, comparator 19 detects this change and generates a detection signal Mx. Comparator 20 generates a control signal for selector 21 to select the output of register 18 with a negative signal when the magnitude at register 18 is larger than that at register 16, while otherwise selector 21 selects the output of register 16 with a positive signal.

Numeral 22 designates a divider for dividing the maximum magnitude signal from register 17 by the second largest signal selected by selector 21. Divider 22 receives both the outputs of comparator circuit 20 and register 17 using the detection signal Mx as a dividend.

Divider 22 eliminates a deviation of the induced voltage in conductive lines, which is caused by unevenness of the media placed on the tablet.

Defining the deviation parameter in a small area as $\alpha$, following equations are represented;

$$V\alpha = \alpha Vs \quad (1)$$

in this equation (1), Vs is a theoretical induced voltage, V$\alpha$ is an actual induced voltage.
Accordingly, in the case of Va and Vb in FIG. 9;

$$Va = \alpha Vsa \quad (2)$$

$$Vb = \alpha Vsb \quad (3)$$

In equations (2) and (3), Vsa and Vsb are theoretical induced voltages of the maximum signal and the second largest signal.

The output of dividing circuit 22 is, therefore;

$$V_R = (VA/Vb) = \alpha Vsa/\alpha Vsb = Vsa/Vsb \quad (4)$$

There is no influence of $\alpha$ in the output $V_R$. The output $V_R$ is used for determining the intermediate coordinates between a pair of adjoining conductive lines, as will be described later.

Figure 11:
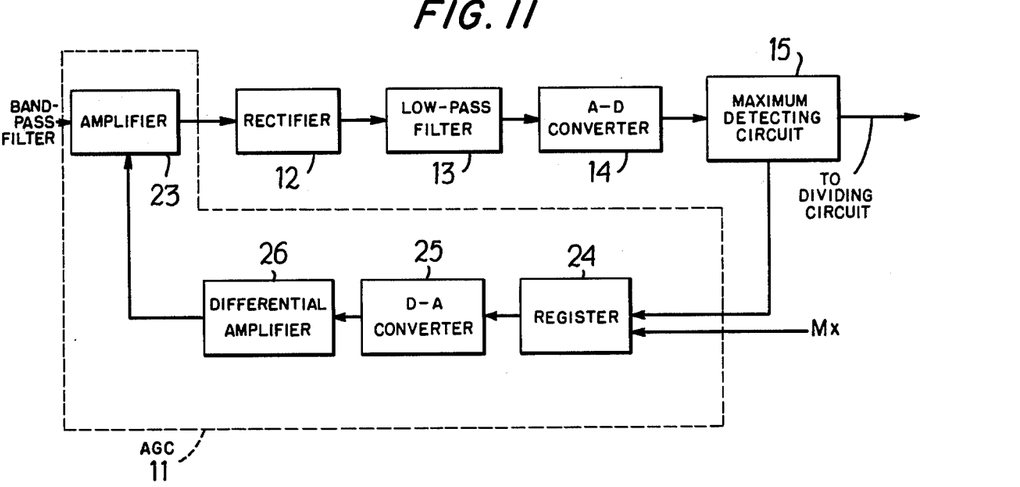
FIG. 11 is a block diagram showing the AGC in FIG. 8.

FIG. 11 is a block diagram showing automatic gain controller 11 in detail, in which numeral 23 designates an amplifier and its gain is controlled by the maximum signal from register 17 through a register 24, a D-A converter 25 and a differential amplifier 26. The register 24 receives the maximum signal as a cue signal of the detection signal Mx from the comparator 19 and stores it. By the output of the differential amplifier 26, the gain of the amplifier 23 is controlled so that the deviation of induced voltages is suppressed.

As mentioned in the above description, the induced voltages show monotonously increasing or decreasing characteristics which gives the maximum magnitude in the nearest conductive line to the winding 5a of probe 5. Accordingly, the divided voltages $V_R$ in the equation (4) represent a curve shown in FIG. 12 including "1" as the minimum.

Figure 12:
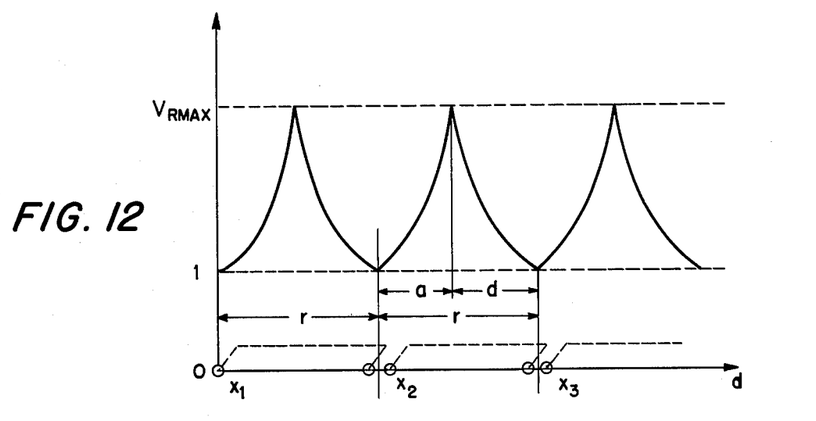
FIG. 12 is a graphical representation of the output of the dividing circuit in FIG. 8.

Now referred to FIG. 12, the voltage $V_R$ has a nonlinear relationship with respect to distance $d$. Outputs from divider 22 shown in FIG. 8 are given to a nonvolatile memory circuit 27 such as a Read Only Memory. Memory circuit 27 stores a reciprocal function defined by a curve shown in FIG. 12 corresponding to FIG. 12. Thus, applying divided voltage $V_R$ to memory circuits as a memory address, position of the probe is obtained.

Figure 13:
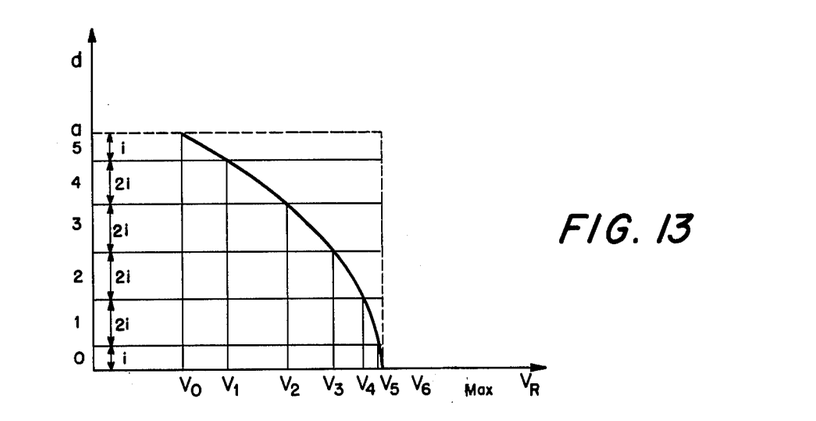
FIG. 13 is a graph showing a correction curve availed in the nonvolatile memory circuit in FIG. 8.

That is, the output of the divider 22 are converted into true coordinates through the memory circuit 27 which stores the data to compensate for nonlinearity along the curve in FIG. 13. Actually, when, for example, one tenth of the pitch $r$ of the conductive lines should be determined, distance "a" is divided into six areas as shown in FIG. 13 with both side areas being one-half of the other areas. The memory circuit 27 stores "5" in memories corresponding to addresses of V0 to V1, "4" in memories corresponding to addresses of V1 to V2, . . . , "0" in memories corresponding to addresses of V5 to V6 so that coordinate values of 1/10 length unit are obtained according to the probe position. If far finer division of distance "a" is required, it is preferable for saving memory capacity to provide memories of which the number is equal to that of the division and to only apply some middle bits of the divided signal $V_R$ to the address of the memory, thereby cutting off lower bits which have no effect on determining coordinates and higher bits which represent zeros. The number of the lower bits to be cut off increases as the signal $V_R$ reaches to 1.

In FIG. 8 numeral 51 designates a clock generator to generator pulses which are fed into a counter 52. The address number of said counter 52 is fed into the scanning circuits 3 and 4. The scanning circuit 3 for the X-axis decodes the address numbers into one of n mutually exclusive signals which are applied to the conductive lines X1, X2, . . . Xn successively, and the scanning circuit 4 also performs for the conductive lines Y1, Y2, . . . Ym successively after the X-axis scanning. After the last scanning signal application to conductive line Xn or Ym, the counter 52 is reset and again starts to count.

Numeral 53 designates a signal detector to alternately detect each end of scanning number and to generate a trigger signal for a flip-flop 54. One of the complementary output terminals Q of the flip-flop 54 is connected to the scanning circuit 4 and the other output terminal $\overline{Q}$ is connected to the scanning circuit 3, so that the scanning circuits 3 and 4 are alternately enabled to operate as described above.

The counting number of said counter 52 represents conductive line coordinates along the X or Y axis, and it is applied for determining length-unit coordinates, which will be described later. But the conductive lines have respectively positional errors caused by the manufacturing process in the strict sense. Converting means 55 and 56, such as read-only memories, are provided to compensate positional errors.

Said converting means 55 and 56 are alternately operated for the X or Y axis under control of the outputs Q and $\overline{Q}$ of said flip-flop 54. Numeral 57 designates a latch register connected between counter 52 and a pair of converting means 55 and 56 to pass the counting number under control of the signal Mx of said maximum detecting circuit 15.

The output of said converting means 55 or 56, i.e. the converted length-unit coordinate signal, and the output of said non-volatile memory or another converting means 27, i.e. the intermediate coordinate signal are fed into an operation circuit 58, in which these signals are added or subtracted in response to the positive or negative signal generated by said maximum detecting circuit 15.

The output of said operation circuit 58 is fed into registers 59 and 60, which are alternately enabled to receive the output of operation circuit 58 under the control of the outputs Q and $\overline{Q}$ of said flip-flop 54.

Thus, the coordinates of the probe 5 are obtained with X-coordinates from the register 59 and Y-coordinates from the register 60.

Signals f1, f2, . . . and fk are also induced in the conductive lines when the winding 5a is excited by the corresponding frequency signals of the probe 5. These signals are respectively discriminated through further band-pass filters, one of which is shown in FIG. 8 with numeral 62. Band-pass filter 62 discriminates a induced signal f1 for making a point-reading signal. A monomultivibrator 63 receives a induced signal f1 through a level discriminator 64 such as a schmidt trigger circuit and the output of the mono-multivibrator 63 is used as the point-reading signal with which one point of coordinates of the probe 5 as it is located is fed into exterior devices such as a computer or to a display panel. Signal f2, f3, . . . or fk may be used for simultaneously determining other probe coordinates using a plurality of probes as shown in FIG. 7 and additional separate maximum signal detectors. This combination of multi-frequency induction and a plurality of band-pass filters is useful for providing a coordinate determining device with wireless probes.

It is to be noted that, in the above-described embodiment, a replacement of diodes D in the conductive lines with switching elements is possible so that the scanning signals successively turn on and off the switching elements for allowing induced signals to be transmitted to the maximum magnitude detector.

It is further to be noted that, with the above substitution, a conversion of the mutual inductive relation of the windings and the conductive lines is possible in which the conductive lines on the tablet successively receive exciting signals from the alternating current signal generator and the signals induced in the windings of the probe are fed into the maximum signal detecting device.

Figure 14:
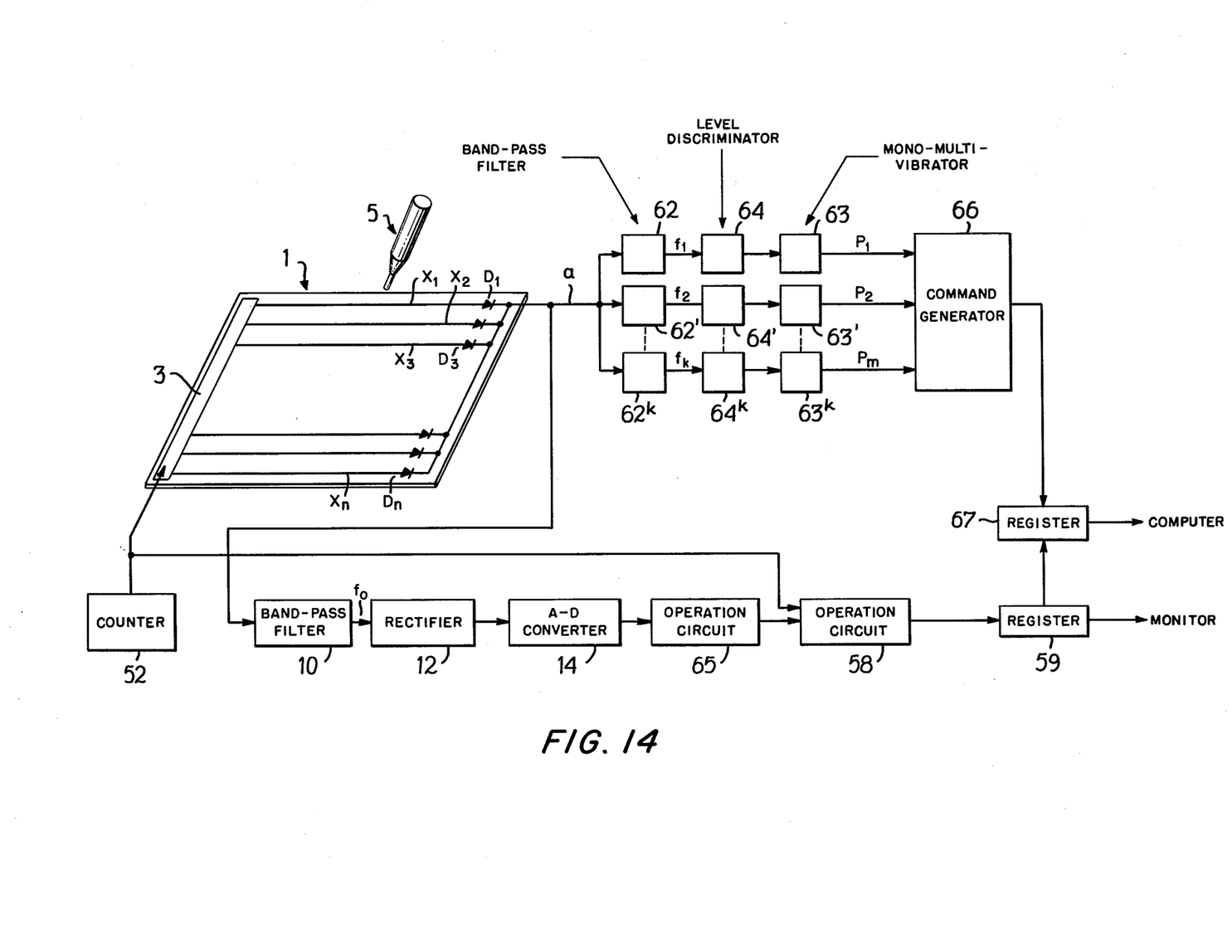
FIG. 14 is a block diagram showing another automatic coordinate determining device according to this invention.

Further, if so accurate a determination of the coordinates is not necessary or very flat media is used, the dividing circuit 22 may be omitted, the maximum signal being directly converted into a true coordinate signal. This embodiment is shown in FIG. 14, in which reference numerals used in FIG. 8 represent the same elements previously described. In FIG. 14, the output of an operation circuit 65 which includes a maximum magnitude detector 15 and a nonvolatile memory circuit 27 to convert the maximum signal from the maximum signal detecting circuit 15 into the true intermediate coordinates is fed into the operation circuit 58. Numeral 66 designates a command generator as described above, which receives various signals respectively generated by induced signals f1, f2, . . . and fk through bandpass filters 62, $62^i$, . . . $62^k$, level discriminators 64, $64^i$, . . . $64^k$ and mono-multivibrators 63, $63^i$, . . . $63^k$, and generates, in response to the induced signals, command signals to a register 67. The register 67 receives the coordinate value in the register 59 and sends it to the exterior device such as a computer in response to the commands.

Figure 15:
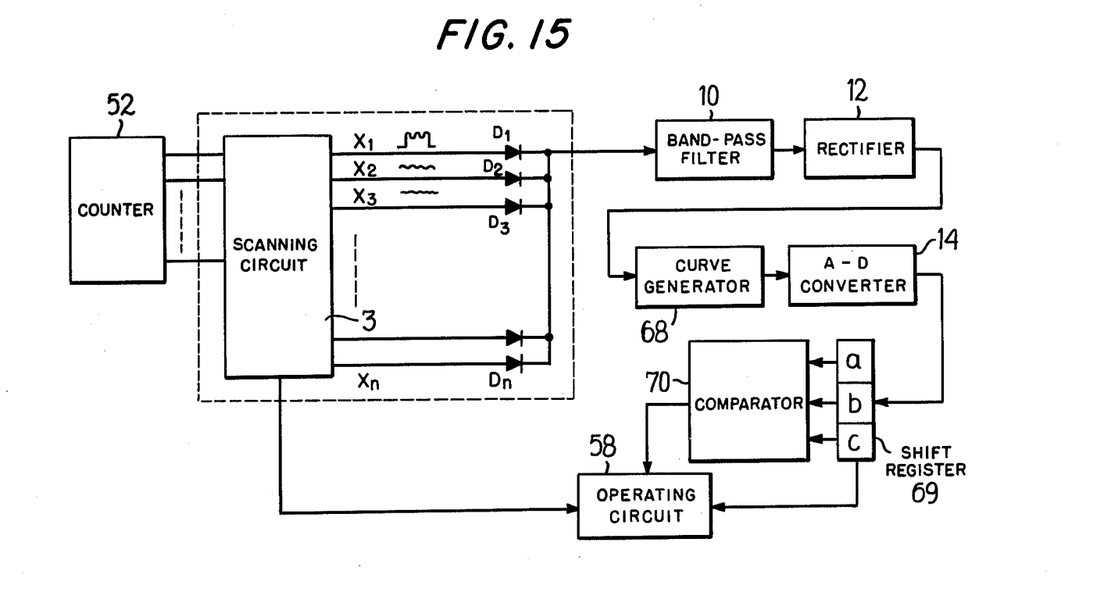
FIG. 15 is a block diagram further showing an automatic coordinate determining device of this invention.

FIG. 15 is a block diagram showing another embodiment of this invention, in which reference numerals used in FIG. 8 represent the same elements previously described. In FIG. 15, a curve generator 68 is connected between rectifier 12 and an A-D converter 14, for converting induced signals into true intermediate coordinate analog signals. Numeral 69 designates a shift registers which operates similar to shift registers (16 to 18) in FIG. 10, and numeral 70 designates a comparator which operates the same as those (19 and 20) in FIG. 10.

In the above automatic coordinates determining device operating by the scanning method, a repeated scanning interval is increased when an area of tablet is increased, and consequently sampling frequencies at any point are decreased. But the drawback can be completely solved by the embodiment shown in FIG. 16. In this embodiment a limited number of scanning lines near the probe 5 are scanned and further the scanning area is varied following the removal of the probe 5.

Figure 16:
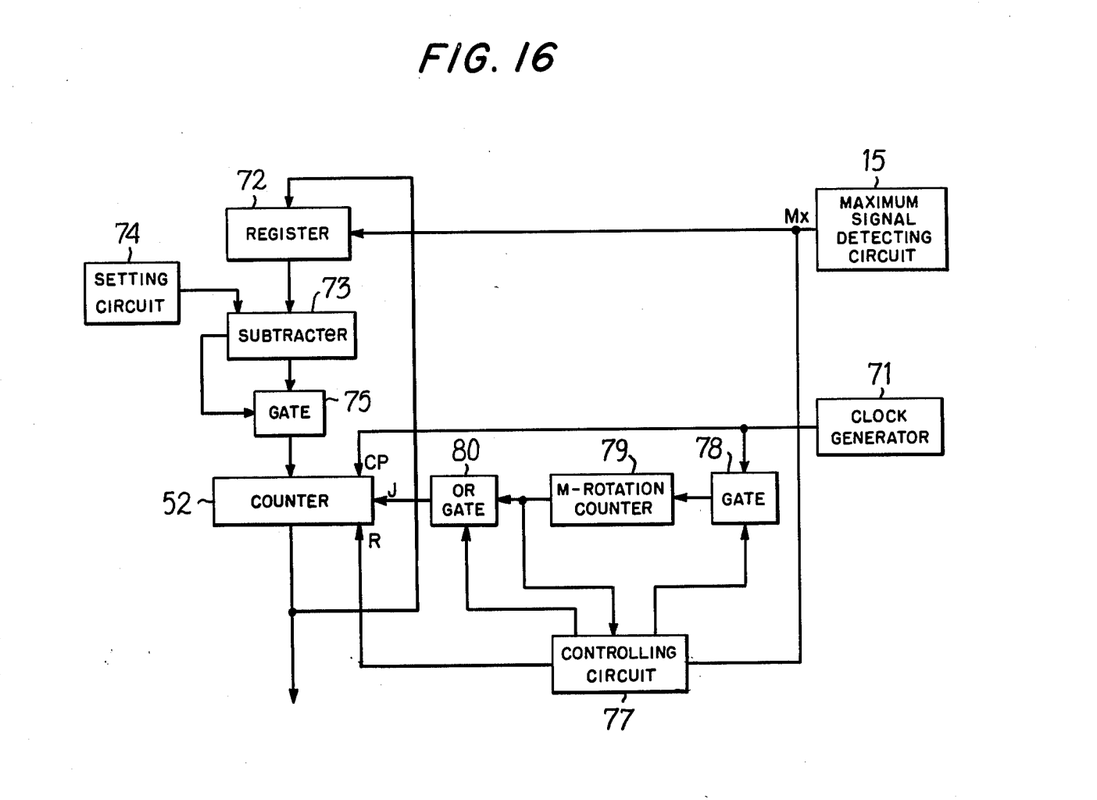
FIG. 16 is a block diagram showing another embodiment of the invention.

FIG. 16 shows a detailed circuit diagram for the counter 52 shown in FIG. 8. On the diagram, circuits 15 and 52 are respectively corresponding to the maximum amplitude detector 15 and the counter 52 shown in FIG. 8.

In FIG. 16, counter 52 renews sequential address under control of pulses from a clock generator 71. Now placing the probe on the desired position on the tablets, signals are induced on the conductive lines, and the maximum detection signal Mx is generated in the maximum magnitude detector 15. At the time, the scanning address is stored in a register 72 upon trigger of the detection signal Mx.

The circuit 73 is a subtracter consisting of an Exclusive-OR gate and a Full Adder to subtract a value from a setting circuit 74 for designated values from a content of register 72. The subtracted value is transferred through a gate 75 to the counter 52 to be stored.

Maximum amplitude detector 15 gives the detection signal Mx to the register 72 to transfer the content of the register 72 to the subtracter 73, and further applies the signal Mx to a controlling circuit 77. Numeral 78 designates a gate which receives pulses from the clock generator 71 and passes them, under control of a control signal of the controlling circuit 77, to an M-rotation or modulo M counter 79. A carrier signal is generated from M-rotation or modulo M counter 79 and this carrier signal is fed into the controlling circuit 77 and to an OR-gate 80 of which the output is fed into J-terminal of the counter 52. A reset signal or a J-signal for the counter 52 is also generated in controlling circuit 77.

The controlling circuit 77 operates as follows; if a detection signal Mx is generated in the maximum amplitude detector 15 in one cycle of scanning on the conductive lines, the controlling circuit 77 sends out an opening signal to the gate 78 and further a J-signal to the counter 52 through the OR-gate 80 after desired time delay, so that the output of the subtracter 73 is transferred to the counter 52, thereby presetting the counter 52. The output of the subtracter 73 has a value of $i-j$ because, at the time of the detection signal Mx generation, the content $i$ (corresponding to the address number of maximum signal) of the register 72 is moved to the subtracter 73 and is subtracted by the preset value $j$ in the setting circuit 74. If $i$ is smaller than $j$, a carrier signal is generated from the subtracter 73 so that the gate 75 inhibits the output of the subtracter 73 from passing, setting preset value of the counter 52 to zero. Accordingly, the scanning starts at a conductive line X$i-j$ immediately after the detection signal Mx generation.

During counting of M pulses, if a detection signal Mx is fed into controlling circuit 77 and to the register 72, a J-signal is again applied to counter 52, presetting the counter 52 to a subtracted value generated at the subtracter 73 in the same manner as described above, and a new scanning being from there.

If the probe 5 is spaced apart from the tablet or at a position on an earlier conductive line than the initial scanning area, the scanning area reaches the end line. In this case, neither detection signal Mx nor carrier signal of the M-rotation counter 79 is applied to the controlling circuit 77 for a longer time than an M-clock passage, and as a result, the controlling circuit 77 sends out a reset signal to the counter 52, whereby scanning beings from the conductive line X.

Figure 17:
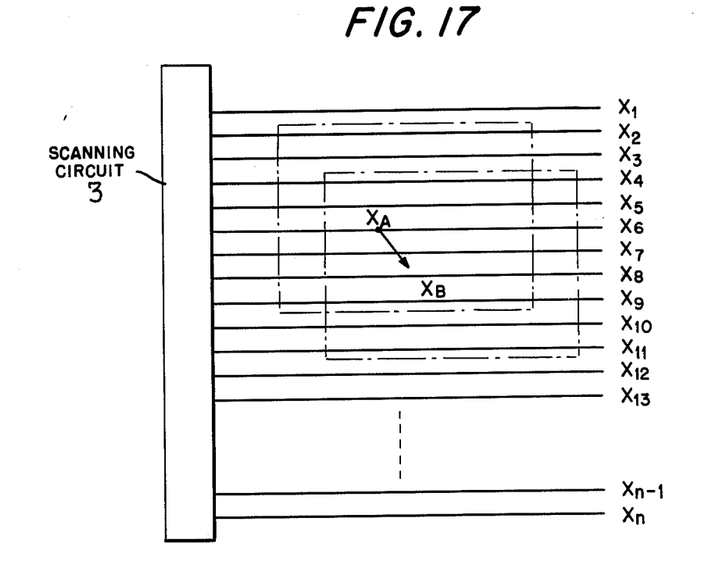
FIG. 17 is a schematic plan view showing a tablet according to the embodiment in FIG. 16.

Referring now to FIG. 17, which is a plan view showing the tablet on which the probe is located at XA at first, a scanning operation according to the aforementioned method will be described in detail. The setting number in the setting circuit 74 is four, and the M of M-rotation counter 79 is eight. Counter 52 starts at first to count from one, and the scanning signal from X1. At the line X6 which is the nearest to the probe, i.e. when the address of counter 52 is six, a detection signal Mx is detected and the subtracted number from the subtracter 73 becomes "6−4=2". Accordingly, the counter 52 is preset to two and the next scanning begins from the line X2.

If the probe moves from XA to XB, the next detection signal Mx is detected when the address of the counter 52 is eight, and accordingly, the subtracted number becomes "8−4=4" and counter 52 is preset to four, the scanning area being shifted as shown in FIG. 3.

Figure 18:
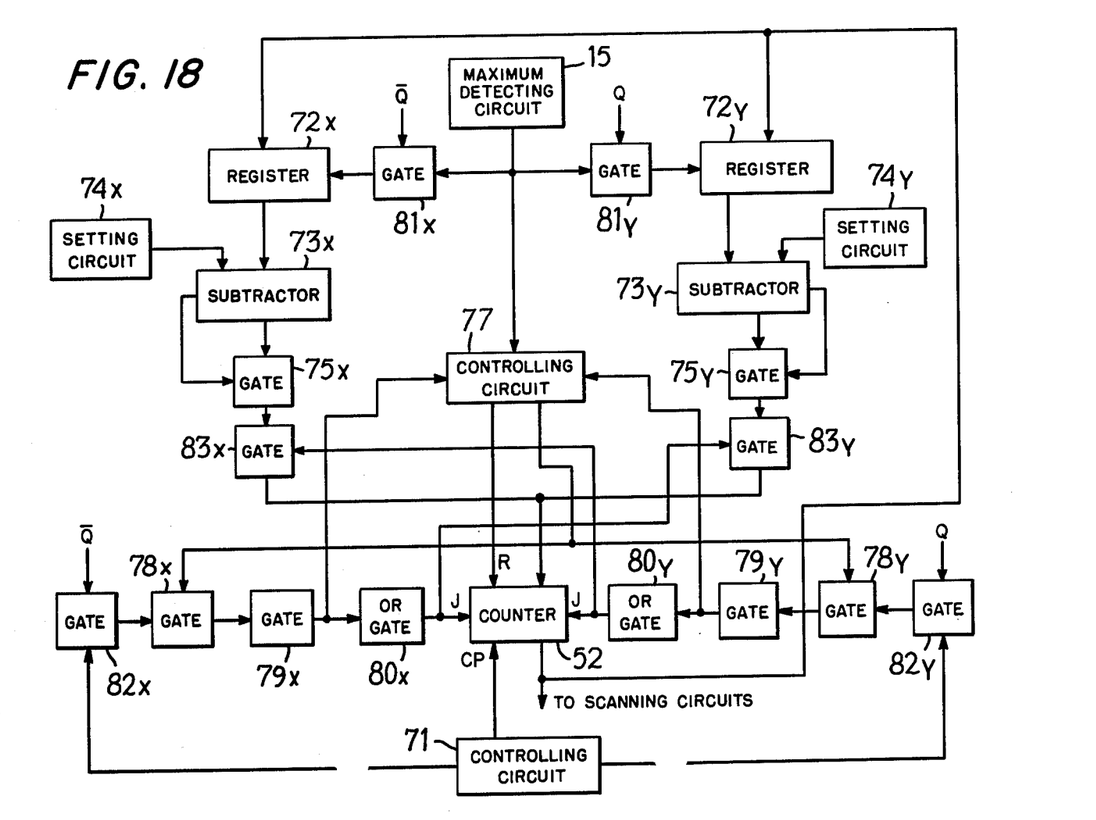
FIG. 18 is a block diagram showing another embodiment according to this invention.

For partial scanning of both the X and Y axes, a modification as shown in FIG. 18 is available.

In FIG. 18, the same reference numerals as those in FIG. 16 are used for designation, with or without suffix X or Y. Lines Q and $\overline{Q}$ are respectively connected to those of the flip-flop 54 in FIG. 8. Numerals 81x, 81y, 82x and 82y designate gates to be opened by a signal Q or $\overline{Q}$. Numerals 83x and 83y designate gates to be opened by a respective signal from an OR-gate 80y or 80x. Other circuit structure and its mode of operation are similar to those in FIG. 16.

With this circuit in FIG. 18, an X-axis partial scanning and a Y-axis partial scanning are alternately performed.

It is to be understood that the invention is not limited to the precise embodiment described above and that further minor modification may be made within the scope of the invention.

What is claimed is:

1. An automatic coordinate determining device, comprising: a coordinate tablet having a plurality of separate parallel spaced conductive lines defining a coordinate of a coordinate system thereon; scanning signal generating means for generating successive scanning signals in response to counting signals generated therein and for successively applying the scanning signals to successive ones of said conductive lines; a probe positionable relative to said coordinate tablet at a coordinate position and having inductive windings for inductively coupling with said conductive lines; an oscillatory signal generator for generating an oscillatory signal; means for applying the oscillatory signal to a respective one of said inductive windings or said conductive lines for inducing an oscillatory signal in the other; maximum-signal detecting means for detecting the maximum induced signal successively induced during the successive application of scanning signals to the conductive lines, wherein said maximum-signal detecting means detects the amplitude of successive induced signals to determine when an amplitude of the induced signals decreases and designates the preceding induced signal as the maximum, and generates a detection signal in response to the maximum-signal condition detected; and means responsive to the detection signal for reading out from said scanning signal generating means a counting signal corresponding to a conductive line between which and said probe the maximum signal was induced, whereby the read out counting signal specifies a coordinate position of said probe relative to the coordinate defined by said plurality of conductive lines.

2. An automatic coordinate determining device as claimed in claim 1, wherein the oscillatory signal from said oscillatory signal generator is applied to the inductive windings of said probe, for inducing signals in said conductive lines, and said conductive lines have a common output line (1) to the maximum-signal detecting device.

3. An automatic coordinate determining device as claimed in claim 2, wherein the output terminals of said scanning circuit are respectively connected direct to said conductive lines, successively giving carrier signals on the conductive lines, and a plurality of rectifying means (Di) having a proper threshold voltage, each of which is connected with one of said conductive lines, and further which comprises a filter (10) connected to said rectifying means for selectively passing the induced signals therethrough to said maximum-signal detecting device.

4. An automatic coordinate determining device as claimed in claim 2, wherein said maximum-signal detecting device includes a band-pass filter (10) to discriminate the signals induced in said conductive lines, a rectifying means (12) to convert each of the successive induced signals passed through said band-pass filter into a direct current signal, and an A-D converter (11) to convert the direct current signals into digital signals which are compared for detecting the maximum signal.

5. An automatic coordinate determining device as claimed in claim 4, further comprising one or more auxiliary oscillatory signal generating means (7) to generate second or more oscillatory signals which selectively alternate or hybridize with said oscillatory signal of the oscillatory signal generator to be applied to said conductive windings, the frequency of said second or more oscillatory signals being different from that of said oscillatory signal, and auxiliary band-pass filters (62), the number of which being equal to that of said auxiliary oscillatory signal generators, to respectively discriminate the oscillatory signals of the corresponding auxiliary oscillatory signal generators.

6. An automatic coordinate determining device as claimed in claim 5, wherein the outputs of said auxiliary band-pass filters are fed to command devices (66) to generate command signals such as coordinate point-reading or time-mode reading.

7. An automatic coordinate determining device as claimed in claim 2, wherein said coordinate tablet is provided with a second set of parallel conductive lines ($Yi$) spaced therein perpendicular to the first set of said parallel conductive lines, the conductive lines of said second set also having said common output line (1), and further which comprises a second scanning circuit (4) generating scanning signals for said second set of conductive lines, the two scanning circuits receiving scanning address signals alternately, and a coordinate converting means (53,54) to discriminate the scanning signals for said second set of conductive lines from those for the first set of conductive lines and to convert the scanning signals into the corresponding coordinate signals.

8. An automatic coordinate determining device as claimed in claim 1, wherein said maximum-signal detecting device compares the latter signal with the signal before a preceding signal, generating a minus signal when the latter is smaller and otherwise a plus signal, and which further comprises a converting means (27) to convert said maximum induced signal into the corresponding true intermediate positional value, and an operation means (58) to add or subtract the intermediate positional value to or from the counting signal from said gate, the addition or the subtraction being selected by the plus or minus signal of said maximum-signal detecting device.

9. An automatic coordinate determining device as claimed in claim 1, wherein said maximum-signal detecting device compares the latter signal with the signal before a preceding signal, detecting the second large amplitude signal from these two signals and generating a minus signal when the latter is smaller and otherwise a plus signal, and which further comprises a dividing circuit (22) to get the ratio of the maximum signal to the second large signal, a converting means (27) to convert said ratio into the corresponding true intermediate positional value, and an operation means (58) to add or subtract the intermediate positional value to or from the counting signal from said gate, the addition or the subtraction being selected by the plus or minus signal of said maximum-signal detecting device.

10. An automatic coordinate determining device as claimed in claim 9, wherein said converting means includes a nonvolatile memory which stores true values corresponding to intermediate positions between a pair of adjacent conductive lines and which receives said ratio from said maximum-signal detecting device as an address signal for selecting the corresponding true intermediate positional value among the stored values.

11. An automatic coordinate determining device as claimed in claim 9, wherein each of said conductive lines has a U-shaped portion.

12. An automatic coordinate determining device as claimed in claim 11, wherein the U-shaped portions of the conductive lines have equal distance between the parallel lines thereof and are spaced parallel and with little gap or without gap.

13. An automatic coordinate determining device as claimed in claim 12, wherein said conductive lines have an equal pitch and said inductive windings have a diameter larger than or equal to two times of said pitch.

14. An automatic coordinate determining device as claimed in claim 9, wherein said conductive lines are spaced in equal distances and the scanning address signals for at least the conductive line at both sides of the tablet prohibit said operation means to operate.

15. An automatic coordinate determining device as claimed in claim 9, said maximum-signal detecting device having an automatic gain controlling circuit (11) to control the induced signals in response to the maximum signal value so as to gain a constant maximum signal value.

16. An automatic coordinate determining device as claimed in claim 9, wherein said coordinate tablet is provided with a second set of parallel conductive lines spaced thereon perpendicular to the first set of said parallel conductive lines, and further which comprises a second scanning circuit generating scanning signals for said second set of conductive lines, the two scanning circuits receiving scanning address signals alternately, and a coordinate converting means to discriminate the scanning signals for said second set of conductive lines from those for the first set of conductive lines and to convert the scanning signals into the corresponding coordinate signals.

17. An automatic coordinate determining device as claimed in claim 9, said conductive lines being located with an equal pitch of $2^n$ times ($n$: an integral number or zero) of the basic length unit apart from adjoining conductive lines.

18. An automatic coordinate determining device as claimed in claim 1, wherein said maximum-signal detecting device compares the latter signal with the signal before a preceding signal, detecting the second large amplitude signal from these two signals and generating a plus signal when the latter is smaller and otherwise a minus signal, and which further comprises a dividing circuit (27) to get the ratio of the maximum signal to the second large amplitude signal, a first converting means (27) to convert said ratio into the corresponding true intermediate positional value, a second converting means (55) to convert said counting signal into the corresponding corrected coordinate signal, and an operation means (58) to add or subtract the intermediate positional value to or from the corrected coordinate signal from said second converting means, the addition or the subtraction being selected by the plus or minus signal of said maximum-signal detecting device.

19. An automatic coordinate determining device as claimed in claim 1, wherein said output terminal of the scanning circuit are respectively connected to controlling terminals of switching elements, each of which is provided on one of said conductive lines for selectively passing the oscillatory signal induced in the conductive lines by said inductive windings or directly generated by said oscillatory signal generator.

20. An automatic coordinate determining device, comprising: a coordinate tablet having a plurality of separate parallel spaced conductive lines defining a coordinate of a coordinate system thereon; scanning signal generating means for generating successive scanning signals in response to scanning address signals generated therein and for successively applying the scanning signals to successive ones of said conductive lines; a probe positionable relative to said coordinate tablet at a coordinate position and having inductive windings for inductively coupling with said conductive lines; an oscillatory signal generator for generating an oscillatory signal; means for applying the oscillatory signal to a respective one of said inductive windings or said conductive lines for inducing an oscillatory signal in the other; maximum-signal detecting means for detecting the amplitude of successive induced signals successively induced during the successive application of scanning signals to the conductive lines, wherein said maximum-signal detecting means detects the maximum-signal by comparing at least two successive induced signals to determine when an amplitude of the induced signals decreases and designating the preceding induced signal as the maximum, and generates a detection signal in response to the maximum-signal condition detected; means responsive to the detection signal for reading out from said scanning signal generating means the scanning address signal corresponding to the maximum induced signal; starting address determining means for determining the next starting address of said scanning address signals according to the address corresponding to the detected maximum signal; and scanning number limiting means for setting a number of said scanning address signals from a starting address at which scanning will occur.

21. An automatic coordinate determining device as claimed in claim 8, wherein each of said conductive lies has a U-shaped portion.

22. An automatic coordinate determining device as claimed in claim 21, wherein the U-shaped portions of the conductive lines have equal distance between the parallel lines thereof and are spaced parallel with little or no gap therebetween.

* * * * *